United States Patent
Wu et al.

(10) Patent No.: US 12,451,771 B2
(45) Date of Patent: Oct. 21, 2025

(54) INVERTER BUS WITH INTEGRATED BLEED RESISTOR

(71) Applicant: FORD GLOBAL TECHNOLOGIES, LLC, Dearborn, MI (US)

(72) Inventors: Ji Wu, Ann Arbor, MI (US); Baoming Ge, Okemos, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 218 days.

(21) Appl. No.: 18/326,302

(22) Filed: May 31, 2023

(65) Prior Publication Data

US 2024/0405644 A1    Dec. 5, 2024

(51) Int. Cl.
*H01M 10/48* (2006.01)
*B60L 53/22* (2019.01)
*H01B 13/00* (2006.01)
*H02K 11/33* (2016.01)
*H02P 27/06* (2006.01)

(52) U.S. Cl.
CPC .............. *H02K 11/33* (2016.01); *B60L 53/22* (2019.02); *H01B 13/0036* (2013.01); *H02P 27/06* (2013.01); *B60L 2210/30* (2013.01); *B60L 2210/40* (2013.01)

(58) Field of Classification Search
CPC ..... H02K 11/33; B60L 53/22; B60L 2210/30; H01B 13/0036; H02P 27/06; F01C 21/10; H01M 10/48
See application file for complete search history.

(56) References Cited

U.S. PATENT DOCUMENTS

| | | | |
|---|---|---|---|
| 4,749,981 A | 6/1988 | Yui et al. | |
| 11,848,458 B1* | 12/2023 | Lawes | ................... H01M 10/48 |
| 2005/0001287 A1 | 1/2005 | Aisenbrey | |
| 2015/0061558 A1* | 3/2015 | Yano | ...................... F01C 21/10 |
| | | | 318/400.26 |

FOREIGN PATENT DOCUMENTS

JP          6544201 B2    7/2019
KR       2190069963 A    6/2019

* cited by examiner

*Primary Examiner* — Cortez M Cook
(74) *Attorney, Agent, or Firm* — David B. Kelley; Brooks Kushman P.C.

(57) ABSTRACT

An electric drive system includes a power electronics module with a prefabricated DC bus bar assembly. The prefabricated DC bus bar assembly includes a molded bleed resistor which serves two different functions. First, it dissipates energy from a capacitor when the battery is disconnected. Secondly, it physically supports the positive bus bar and the negative bar with respect to one another.

20 Claims, 5 Drawing Sheets

INVERTER BUS WITH INTEGRATED BLEED RESISTOR

TECHNICAL FIELD

The present disclosure relates to inverters for electrified vehicles. More particularly, it relates to an inverter having a bleed resistor.

BACKGROUND

Electrified vehicles utilize batteries which provide the electrical energy in a Direct Current (DC) form. The powertrains utilize motors to convert electrical energy into mechanical torque to propel the vehicle. Several types of motors, such as permanent magnet synchronous motors, require that the electrical energy be in Alternating Current (AC) form. Inverters are used to convert the DC electrical power from the battery to AC electrical power at the frequency and phase that is required for the motor. A contactor switch may be provided between the battery and the inverter to de-energize the inverter when the vehicle is not in use, for the protection of service personnel among others. However, the inverter may include a capacitor which also stores electrical energy and is not disabled by the contactor switch. Bleed resistors may be used to gradually dissipate the energy from the capacitor.

SUMMARY

An electric drive system includes two rigid bus bars, a power electronics module, and a molded bleed resistor. The power electronics module is configured to transform direct current power carried by the bus bars into alternating current power. The power electronics module includes a capacitor connected between the two bus bars. The molded bleed resistor is bonded directly to the bus bars such that the molded bleed resistor rigidly fastens the two bus bars to one another. The bleed resistor is configured to dissipate energy from the capacitor. The electric drive system may include a variable voltage converter and an inverter. If present, the variable voltage converter is configured to deliver the direct current power at a second voltage different than a battery voltage. The inverter is then configured to convert the power at the second voltage into alternating current power. The bus bars may connect the variable voltage convert to the inverter. The bleed resistor may encircles both of the two bus bars. The bleed resistor may be formed from a polymer or a ceramic and fine carbon particles. The electric drive system may also include a contactor switch electrically connected to one of the two bus bars and a battery electrically connected to the contactor switch and to the other bus bar.

A method of fabricating a bus bar assembly includes holding two rigid conductive bus bars in a predetermined position relative to one another and injecting substance between the bus bars. For example, the bus bars may be held in the predetermined position by placing them into a mold. The bus bars are not in contact with each other in the predetermined position. The substance bonds to the bus bars and hardens, thereby rigidly attaching the two bus bars together in the predetermined relative position. The substance contains fine carbon particles such that it forms a bleed resistor. The substance may also contain a polymer or a ceramic. The mold may be shaped such that the bleed resistor encircles both of the two bus bars.

A method of assembling an electric drive system includes connecting a DC bus bar assembly to a power electronics module. The power electronics module includes a capacitor and an inverter. The DC bus bar assembly includes a positive bus bar and a negative bus bar rigidly fastened to one another by a molded bleed resistor. The molded bleed resistor is bonded to the positive bus bar and the negative bus bar prior to connection to the power electronics module. The bleed resistor may encircle both the positive bus bar and the negative bus bar. The bleed resistor may contain a polymer or a ceramic and fine carbon particles. The method may also include electrically connecting a contactor switch to one of the bus bars and electrically connecting a battery to the contactor switch and to the other bus bar. Alternatively, the method may include electrically connecting the positive bus bar to an output of a variable voltage converter.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
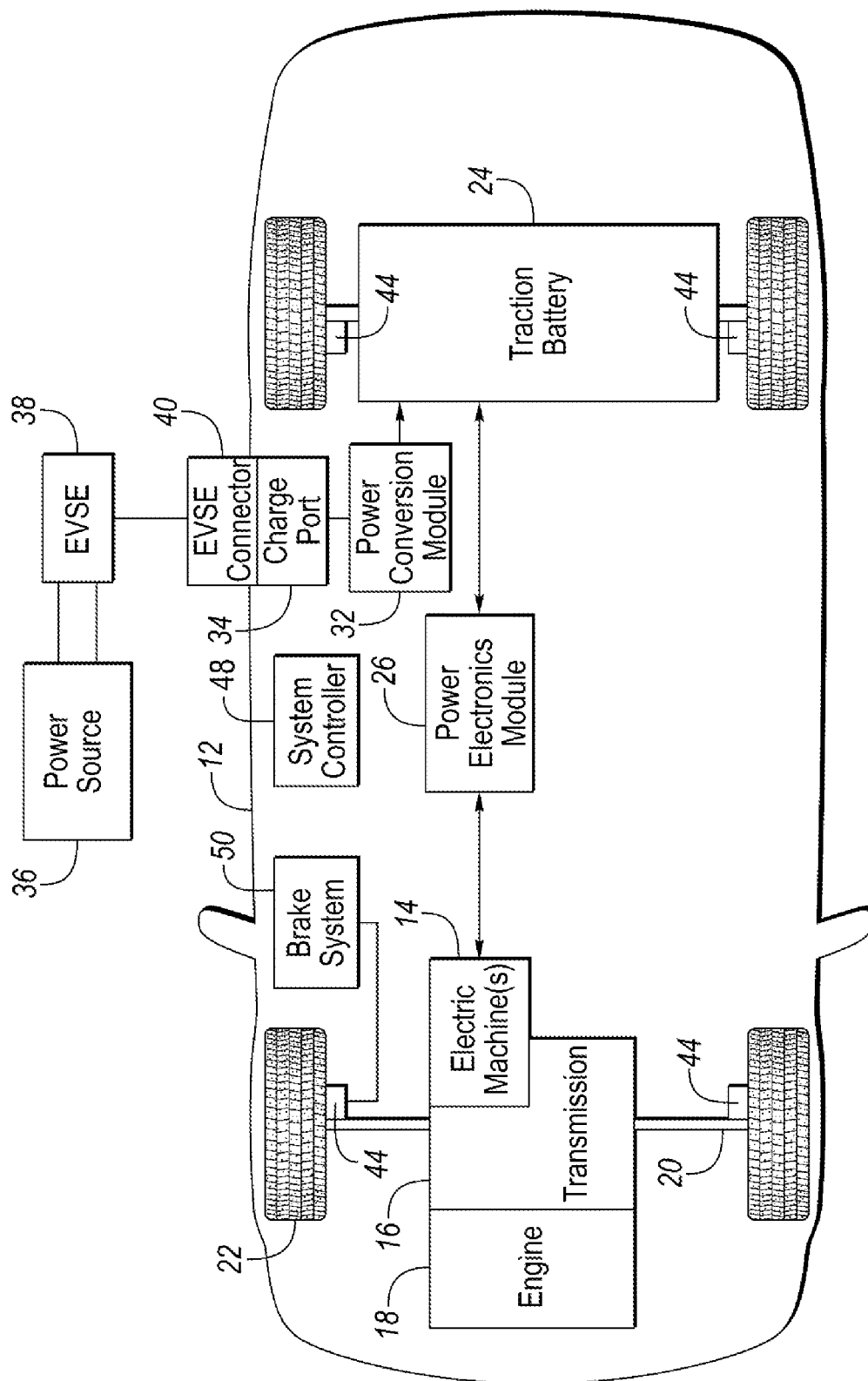
FIG. 1 illustrates a block diagram of an electric vehicle.

Referring now to FIG. 1, a block diagram of an exemplary electric vehicle ("EV") 12 is shown. In this example, EV 12 is a plug-in hybrid electric vehicle (PHEV). EV 12 includes one or more electric machines 14 ("e-machines") mechanically connected to a transmission 16. Electric machine 14 is capable of operating as a motor and as a generator. Transmission 16 is mechanically connected to an engine 18 and to a drive shaft 20 mechanically connected to wheels 22. Electric machine 14 can provide propulsion and slowing capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing EV 12 to be operated in electric mode with engine 18 off under certain conditions.

A traction battery 24 ("battery) stores energy that can be used by electric machine 14 for propelling EV 12. Battery 24 typically provides a high-voltage (HV) direct current (DC) output. Battery 24 is electrically connected to a power electronics module 26. Power electronics module 26 is electrically connected to electric machine 14 and provides the ability to bi-directionally transfer energy between battery 24 and the electric machine 14. For example, battery 24 may provide a DC voltage while electric machine 14 may require a three-phase alternating current (AC) voltage to function. Power electronics module 26 may convert the DC voltage to a three-phase AC voltage to operate electric machine 14. In a regenerative mode, power electronics module 26 may convert three-phase AC voltage from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and EV 12. External power source 36 may provide DC or AC electric power to EVSE 38. EVSE 38 may have a charge connector 40 for plugging into a charge port 34 of EV 12. Charge port 34 may be any type of port configured to transfer power from EVSE 38 to EV 12. A power conversion module 32 of EV 12 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for slowing and preventing motion of EV 12. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers can be microprocessor-based devices. The controllers may communicate via a serial bus (e.g., Controller Area Network (CAN)) or via discrete conductors. For example, a system controller 48 (i.e., a vehicle controller) is present to coordinate the operation of the various components.

As described, EV 12 is in this example is a PHEV having engine 18 and battery 24. In other embodiments, EV 12 is a battery electric vehicle (BEV). In a BEV configuration, EV 12 does not include an engine.

Figure 2:
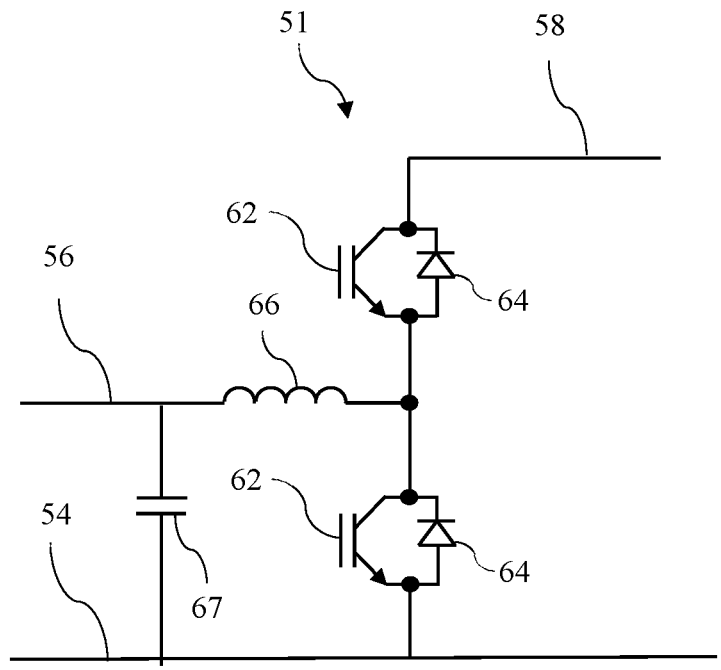
FIG. 2 is a circuit diagram of a variable voltage converter of the power electronics module of the electric vehicle of FIG. 1.
Figure 3:
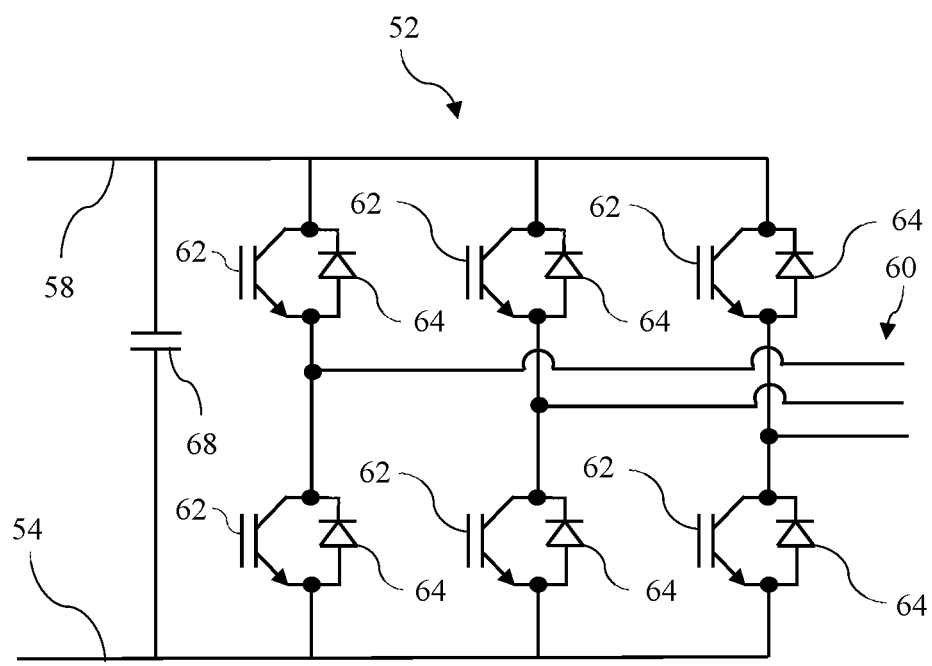
FIG. 3 is a circuit diagram of an inverter of the power electronics module of the electric vehicle of FIG. 1.

Referring now to FIGS. 2 and 3, schematic diagrams of components of power electronics module 26 in an electric drive system of EV 12 is shown. As described above, power electronics module 26 is coupled between battery 24 and motor 14. Power electronics module 26 converts DC electrical power provided from battery 24 into AC electrical power for providing to motor 14. In this way, power electronics module 26 drives motor 14 with power from battery 24 for the motor to propel EV 12. During regenerative braking, power electronics module 26 converts the AC power induced within motor 14 to DC power to charge battery 24.

Power electronics module 26 includes a DC-DC converter 51 and an inverter 52. As known to those of ordinary skill, inverters convert DC power to multi-phase AC power (three-phase being most common). DC-DC converters can boost (increase) or buck (decrease) the DC voltage available to the inverter from what is available from the battery. DC power from the battery is delivered on a negative bus bar 54 and a positive bus bar 56. Bus bars 54 and 56 form a first DC bus. DC power from the converter 51 is delivered to inverter 52 by negative bus bar 54 and positive bus bar 58. Bus bars 54 and 58 form a second DC bus. Inverter 52 delivers AC power to the motor via AC terminals 60. Some embodiments may omit the DC-DC converter 51.

Converter 51 and inverter 52 include a plurality of power switch units. Each power switch unit includes a power switch 62 arranged anti-parallel with a diode 64. Converter 51 also includes an inductor 66 and a capacitor 67. Inverter 52 also includes a capacitor 68. The switches 62 may be, for example, Silicon Carbide (SiC) or Insulated Gate Bipolar Transistors (IGBTs).

Figure 4:
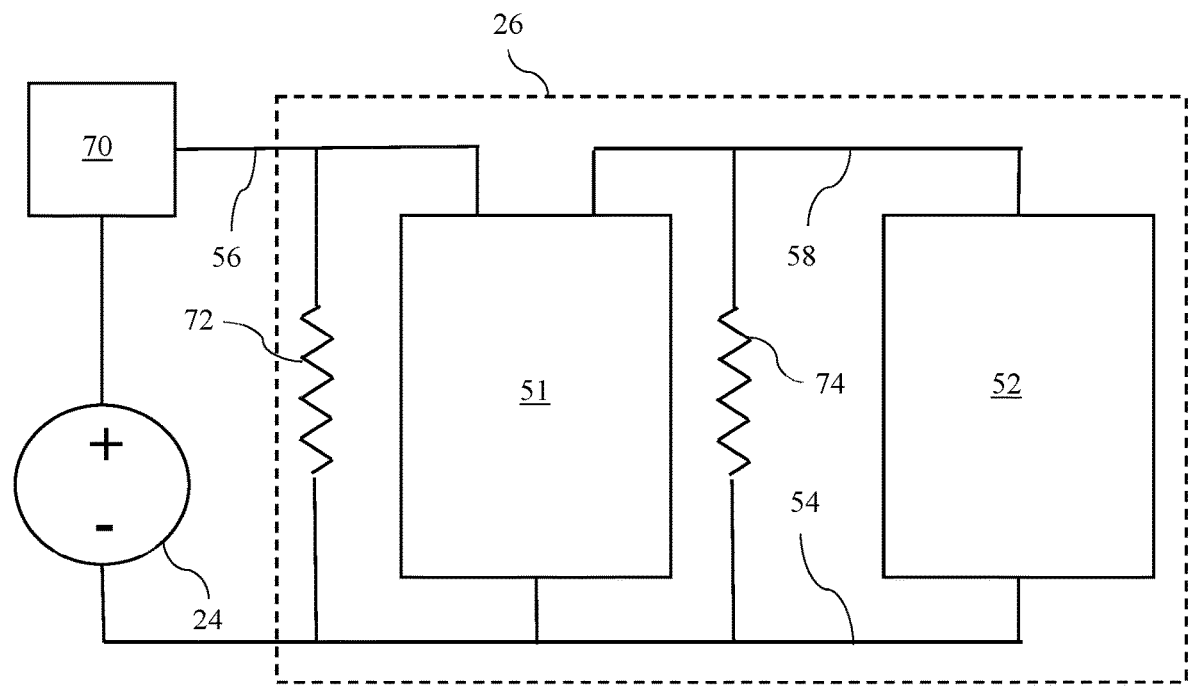
FIG. 4 is a schematic diagram of the power electronics system that includes the power variable voltage converter of FIG. 2, the inverter of FIG. 3, and the battery.

FIG. 4 schematically illustrates additional components of an electric drive system. The negative bus bar 54 is electrically connected to a negative terminal of battery 24. A contactor switch 70 is electrically connected between the positive battery terminal and the positive bus bar 56. Opening the contactor switch 70 disconnects DC power stored in the battery from the power electronics module 26. In alternative embodiments, the contactor switch may be connected between the battery and the negative bus bar.

Although opening the contactor switch disconnects the battery, a substantial amount of electrical power may be retained in the capacitors 67 and 68. To dissipate this energy, bleed resistors 72 and 74 are installed between the negative bus bar 54 and the positive bus bar of the respective first and second DC busses. The resistance of the bleed resistors is selected to be high enough that it doesn't dissipate an excessive amount of energy during normal operation but low enough that the energy stored in the capacitors 67 and 68 is dissipated at a sufficient rate when contactor switch 70 is open.

Figure 5:
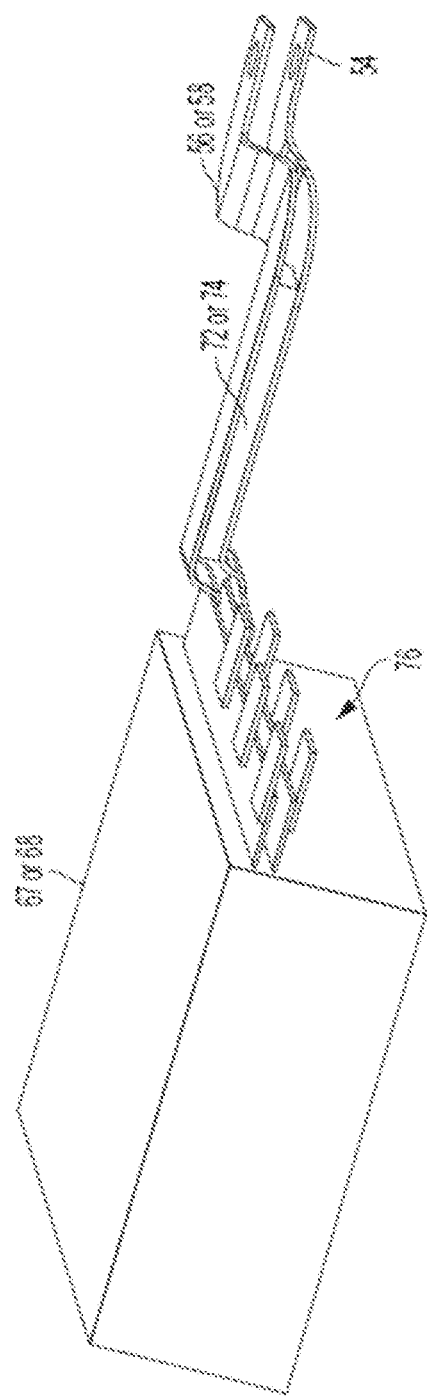
FIG. 5 is a pictorial view of a first embodiment of a DC bus having a molded bleed resistor.
Figure 7:
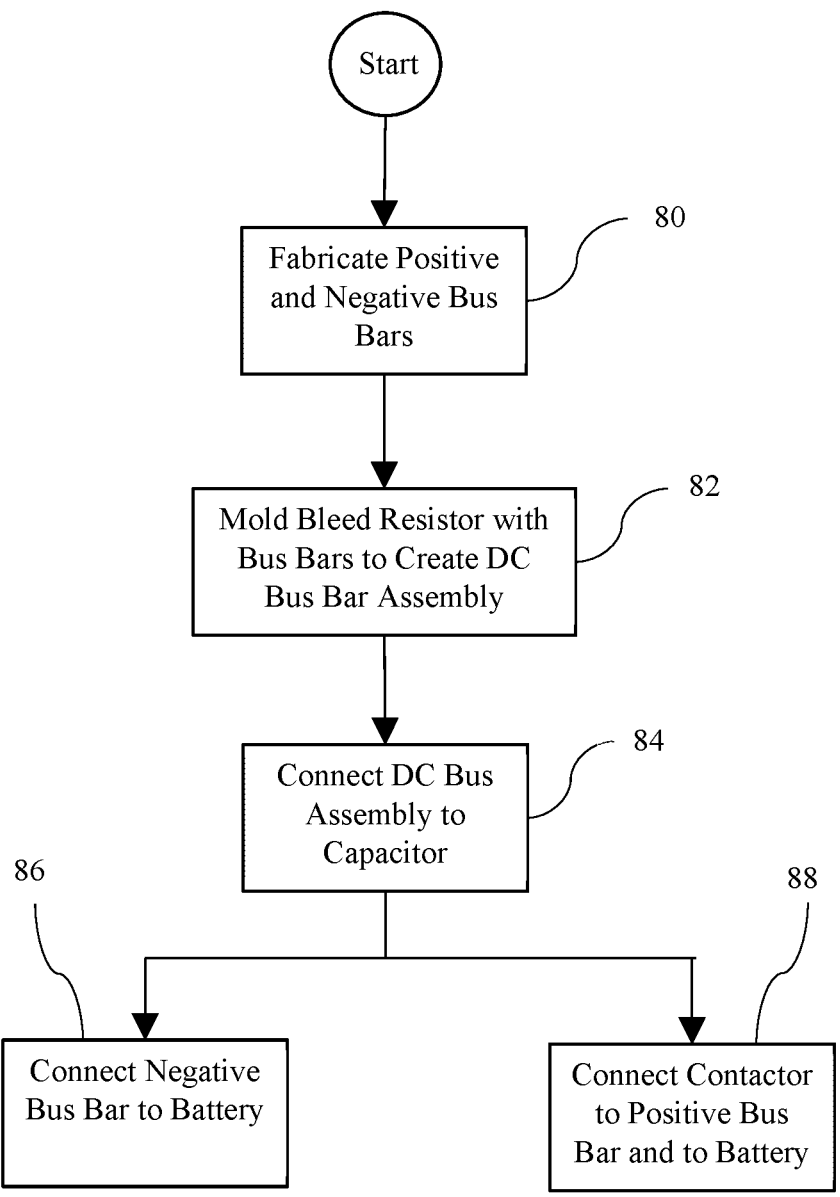
FIG. 7 is a flow chart for a manufacturing process for the power electronics system of FIG. 4.

FIG. 5 is a pictorial view indicating the physical arrangement of a DC bus with a bleed resistor and a capacitor. The first DC bus includes negative bus bar 54, positive bus bar 56, and bleed resistor 72 and is connected to capacitor 67. The second DC bus includes negative bus bar 54, positive bus bar 58, and bleed resistor 74 and is connected to capacitor 68. Terminals 76 are provided to connect to other components of the respective converter or inverter. The bus bars are rigid metal components. The bleed resistor is bonded to opposing surfaces of the bus bars. The bleed resistor may be made, for example, from either a polymer or a ceramic infused with fine carbon particles to provide the desired level of electrical resistance. In addition to providing the desired resistance, the bleed resistor fastens the bus bars to one another and rigidly positions them with respect to one another. This reduces the chance of one of both bus bars being accidentally bent and coming into contact with the other one. As discussed below, it also facilitates assembly. The bleed resistor is separated from the capacitor and other power electronics components such that heat generated at the bleed resistor will not heat the other components.

Figure 6:
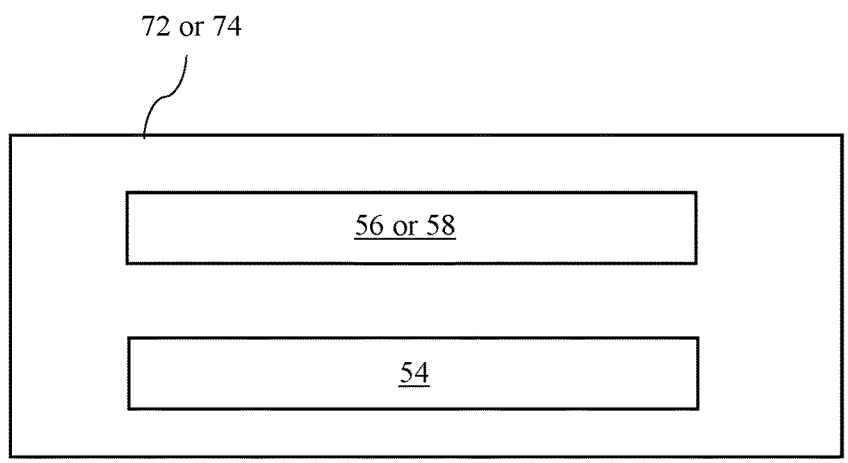
FIG. 6 is a cross sectional view of a bleed resistor and DC bus bar according to a second embodiment.

FIG. 6 is a cross-section through the bleed resistor in one possible embodiment. In this embodiment, the bleed resistor 72 or 74 encircles both the negative bus bar 54 and the positive bus bar 56 or 58. This embodiment provides additional bonding area to increase the fastening capability of the bleed resistor. The bleed resistor may be formed from a polymer or ceramic base material infused with fine carbon particles. The quantity of fine carbon particles is set to establish the desired resistance value.

FIG. 6 is a flowchart for a manufacturing process to fabricate and install a power electronics module having a molded bleed resistor. At 80, the positive bus bar 56 or 58 and the negative bus bar 54 are fabricated. The bus bars are each fabricated from electrically conductive materials. The bus bars may be fabricated, for example, using stamping processes. At 82, the bleed resistor 72 or 74 is molded with the bus bars to create the bus bar assembly. An over-molding process may be utilized wherein the positive and negative bus bars are placed in a mold before the fine carbon particle infused plastic or ceramic material is injected into the mold. After molding, the bleed resistor rigidly supports the positive bus bar and the negative bus bar in position with respect to one another. As such, the bus bar assembly can be easily handled or shipped between assembly locations. At 84, the DC bus bar assembly is attached mechanically and electrically to the capacitor. The bus bars are also attached to other components depending on whether this is the first DC bus or the second DC bus. At 86, the negative bus bar is connected to the negative terminal of the battery. At 88, the contactor is electrically connected in series between the positive terminal of the battery and the positive bus bar. In alternative embodiments, a contactor switch may be installed between the negative terminal of the battery and the negative bus bar either instead of or in addition to the contactor switch between the positive battery terminal and the positive bus bar. In the case of the second DC bus, the positive bus bar would instead be electrically connected to the output of the variable voltage converter.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric drive system, comprising:
   two rigid bus bars;
   a power electronics module configured to transform direct current power carried by the bus bars into alternating current power, the power electronics module including a capacitor connected between the two rigid bus bars; and
   a molded bleed resistor comprising fine carbon particles bonded directly to the bus bars such that the molded bleed resistor rigidly fastens the two bus bars to one another, the bleed resistor configured to dissipate energy from the capacitor.

2. The electric drive system of claim 1, wherein the power electronics module comprises:
   a variable voltage converter configured to deliver the direct current power at a second voltage different than a battery voltage; and
   an inverter configured to convert the power at the second voltage into alternating current power.

3. The electric drive system of claim 2 wherein the bus bars connect the variable voltage convert to the inverter.

4. The electric drive system of claim 1 wherein the bleed resistor encircles both of the two bus bars.

5. The electric drive system of claim 1 further comprising a contactor switch electrically connected to one of the two bus bars.

6. The electric drive system of claim 5 further comprising a battery electrically connected to the contactor switch and to another of the two bus bars.

7. The electric drive system of claim 1 wherein the bleed resistor further comprises:
   a polymer.

8. The electric drive system of claim 1 wherein the bleed resistor further comprises:
   a ceramic.

9. A method of fabricating a bus bar assembly for an electric drive system, the method comprising:
   holding two rigid conductive bus bars in a predetermined position relative to one another but not in contact with each other; and
   injecting a substance between the two bus bars which bonds to the bus bars and hardens, thereby rigidly attaching the two bus bars together in the predetermined relative position;
   wherein the substance contains fine carbon particles such that it forms a bleed resistor.

10. The method of claim 9 wherein holding the two bus bars in the predetermined position comprises placing the two bus bars into a mold.

11. The method of claim 10 wherein the mold is shaped such that the bleed resistor encircles both of the two bus bars.

12. The method of claim 9 wherein the substance comprises a polymer.

13. The method of claim 9 wherein the substance comprises a ceramic.

14. A method of assembling an electric drive system, comprising:
   connecting a DC bus bar assembly to a power electronics module, wherein the power electronics module includes a capacitor and an inverter, and wherein the DC bus bar assembly includes a positive bus bar and a negative bus bar rigidly fastened to one another by a molded bleed resistor comprising fine carbon particles, the molded bleed resistor bonded to the positive bus bar and the negative bus bar prior to connection to the power electronics module.

15. The method of claim 14 wherein the bleed resistor encircles both the positive bus bar and the negative bus bar.

16. The method of claim 14 wherein the bleed resistor further comprises:
   a polymer.

17. The method of claim 14 wherein the bleed resistor further comprises:
   a ceramic.

18. The method of claim 14 further comprising electrically connecting a contactor switch to one of the positive bus bar and the negative bus bar.

19. The method of claim 18 further comprising electrically connecting a battery to the contactor switch and to another of the positive bus bar and the negative bus bar.

20. The method of claim 14 further comprising electrically connecting the positive bus bar to an output of a variable voltage converter.

* * * * *